(12) United States Patent
Achmann et al.

(10) Patent No.: US 12,496,000 B2
(45) Date of Patent: Dec. 16, 2025

(54) SENSOR ELEMENTS FOR DETECTING AN ANALYTE IN A BODY FLUID SAMPLE AS WELL AS METHODS OF MAKING THE SAME

(71) Applicant: Roche Diabetes Care, Inc., Indianapolis, IN (US)

(72) Inventors: Sabine Achmann, Mannheim (DE); Holger Kotzan, Ladenburg (DE); Ulrich Mueller, Dortmund (DE); Monika Strasser, Mannheim (DE); Herbert Wieder, Lampertheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 767 days.

(21) Appl. No.: 14/566,033

(22) Filed: Dec. 10, 2014

(65) Prior Publication Data

US 2015/0099954 A1 Apr. 9, 2015

Related U.S. Application Data

(63) Continuation of application No. PCT/EP2013/063367, filed on Jun. 26, 2013.

(30) Foreign Application Priority Data

Jun. 29, 2012 (EP) .................... 12174251

(51) Int. Cl.
*A61B 5/1473* (2006.01)
*A61B 5/145* (2006.01)
*A61B 5/1468* (2006.01)

(52) U.S. Cl.
CPC ........ *A61B 5/1473* (2013.01); *A61B 5/14532* (2013.01); *A61B 5/14546* (2013.01); *A61B 5/1468* (2013.01)

(58) Field of Classification Search
None
See application file for complete search history.

(56) References Cited

U.S. PATENT DOCUMENTS

| | | | | |
|---|---|---|---|---|
| 4,969,463 A | * | 11/1990 | Dahl ............... | A61B 5/287 607/5 |
| 5,387,329 A | * | 2/1995 | Foos ............... | C08F 220/14 204/403.06 |
| 5,391,250 A | * | 2/1995 | Cheney ........... | G01N 27/3272 156/286 |

(Continued)

FOREIGN PATENT DOCUMENTS

| | | |
|---|---|---|
| WO | 2005/078424 A1 | 8/2005 |
| WO | 2007/071562 A1 | 6/2007 |

*Primary Examiner* — Jacqueline Cheng
*Assistant Examiner* — Jairo H Portillo
(74) *Attorney, Agent, or Firm* — Bose McKinney and Evans LLP

(57) ABSTRACT

Sensor elements are provided for determining at least one analyte concentration in a body fluid. The sensor elements are at least partially implantable into a body tissue and have a substrate and at least two electrodes. One electrode is a working electrode having at least one conductive pad applied to the substrate and at least one electrically conductive sensor material is applied to the conductive pad that includes at least one detector substance adapted to perform an electrically detectable electrochemical detection reaction with the analyte. Another electrode is a counter electrode having at least one counter electrode conductive pad applied to the substrate. The sensor elements also include at least one electrically insulating material that surrounds at least the counter electrode on all sides, where a height of the electrically insulating material at least equals a height of the counter electrode conductive pad.

23 Claims, 6 Drawing Sheets

(56) References Cited

U.S. PATENT DOCUMENTS

| | | | |
|---|---|---|---|
| 6,695,958 B1* | 2/2004 | Adam | G01N 27/3272 204/403.09 |
| 8,886,277 B2* | 11/2014 | Kim | H01L 23/3135 607/116 |
| 2005/0036906 A1* | 2/2005 | Nakahara | G01N 27/3272 422/400 |
| 2005/0045476 A1* | 3/2005 | Neel | C12Q 1/006 204/403.02 |
| 2005/0272989 A1* | 12/2005 | Shah | A61B 5/14532 600/345 |
| 2006/0257996 A1* | 11/2006 | Simpson | A61B 5/14532 435/287.2 |
| 2007/0161070 A1* | 7/2007 | Wilsey | C12Q 1/001 435/14 |
| 2007/0240986 A1* | 10/2007 | Reymond | B01L 3/5027 204/412 |
| 2008/0275326 A1* | 11/2008 | Kasielke | H05K 1/028 600/373 |
| 2008/0281177 A1* | 11/2008 | Say | A61B 5/14532 600/347 |
| 2009/0099433 A1* | 4/2009 | Staib | A61B 5/14532 600/345 |
| 2009/0156920 A1* | 6/2009 | Kotzan | C12Q 1/006 600/347 |
| 2009/0198117 A1 | 8/2009 | Cooper et al. | |
| 2009/0292189 A1* | 11/2009 | Say | A61M 5/1723 600/347 |
| 2010/0230285 A1* | 9/2010 | Hoss | A61B 5/14532 204/415 |
| 2010/0288632 A1* | 11/2010 | Say | A61B 5/14532 204/403.01 |
| 2011/0021889 A1 | 1/2011 | Hoss et al. | |
| 2011/0137142 A1* | 6/2011 | Lucisano | A61B 5/25 600/347 |
| 2012/0323098 A1* | 12/2012 | Moein | A61B 5/1486 600/345 |
| 2013/0313130 A1* | 11/2013 | Little | A61B 5/14532 205/792 |

* cited by examiner

SENSOR ELEMENTS FOR DETECTING AN ANALYTE IN A BODY FLUID SAMPLE AS WELL AS METHODS OF MAKING THE SAME

CROSS-REFERENCE TO RELATED APPLICATIONS

This patent application is a continuation of Int'l Patent Application No. PCT/EP2013/063367; filed 26 Jun. 2013, which claims priority to and the benefit of EP Patent Application No. 12174251.4; filed 29 Jun. 2012. Each patent application is incorporated herein by reference as if set forth in its entirety.

TECHNICAL FIELD

This patent application relates generally to engineering and medicine, and more particularly, it relates to sensor elements having improvements with respect to attenuating unwanted, increased or inhomogeneous gas formation at one or more of the electrodes, as well as methods of making the same.

BACKGROUND

Determining one or more analyte concentrations, such as glucose, in one or more body fluids, such as interstitial fluid and/or blood, is an essential component of therapy and/or prevention in many diseases. Specifically, determining blood glucose concentration, as well as a corresponding medication such as insulin, is an essential part of daily routine for many persons with diabetes. To increase convenience and to avoid restricting the daily routine by more than a tolerable degree, portable devices are known in the art for measuring blood glucose concentration during work, leisure or other activities away from home. Specifically, electrochemical measuring methods are known using sensors that are fully or partially implantable into a body tissue of the user and that are capable of providing continuous or discontinuous analyte concentration measurements. See, e.g., WO Patent Application Publication Nos. 2005/078424, 2007/071562 and 2012/089505; as well as US Patent Application Publication Nos. 2011/0021889 and 2010/0230285.

Sensor elements for electrochemically detecting at least one analyte concentration in a body fluid, such as a glucose concentration in blood and/or interstitial fluid, typically include at least one working electrode (WE) and at least one counter electrode (CE). Additionally or optionally, the sensor element may include at least one reference electrode (RE), which may be combined with the CE. For potential electrode materials, both for the WE and the CE, as well as for potential electrochemical measurement setups for measuring analyte concentration by amperometric setups, reference may be made to WO Patent Application Publication No. 2007/071562; however, other types of measurement setups are possible to derive an analyte concentration from a comparison of electrode potentials.

In typical electrochemical sensor setups, the CE closes the electric circuit to the WE. For this purpose, redox currents and/or, to a lower extent, capacitive charging currents typically are used. In this manner, the WE includes at least one detector substance adapted to perform an oxidation reaction or a reduction reaction with the analyte of interest. To detect glucose, for example, the detector substance can be at least one enzyme such as glucose oxidase (GOD). When the detection reaction includes an oxidation reaction at the WE, the CE typically provides a reduction reaction to close the electric circuit.

Various electrode setups are known. For example, US Patent Application Publication No. 2009/0198117 discloses an implantable sensor element for a mammal. The sensor element includes a base layer, a conductive layer disposed on the base layer, an analyte-sensing layer, and an analyte-modulating layer disposed on the analyte-sensing layer. The conductive layer includes a WE having a plurality of conductive nanotubes. The analyte-sensing layer includes an oxidoreductase disposed on the conductive nanotubes, which generates hydrogen peroxide ($H_2O_2$) in the presence of the analyte of interest. The analyte-modulating layer modulates diffusion of the analyte therethrough.

As mentioned above, various electrode combinations are known. For example, in three electrode setups, a WE, CE and at least one RE are provided, where the RE is independent of the CE. As such, the potential of the CE may be adjusted independently from the potential of the RE. As explained in greater detail in WO Patent Application Publication No. 2007/071562, a potentiostatic controller may be provided, which, on one hand, provides a desired potential difference or voltage between the WE and the RE and, on the other hand, is adapted so that a current of the detection reaction taking place at the WE is balanced by an appropriate counter process at the CE, thereby closing the electric circuit. For the latter purpose, the CE has to be adjusted to a potential at which the appropriate and required current is generated by an appropriate electrode reaction at the CE.

The process taking place at the CE may be compared to the process of galvanostatic potentiometry. The CE generally will attain a potential at which the redox process generates the required current. In case this redox process of one redox system is insufficient for providing an appropriate current, the reaction partners will diminish, and the CE will proceed to a potential of a subsequent redox reaction until the sum of all partial currents is sufficient for generating an appropriate counter current for balancing the detection reaction of the WE.

The potential and electrode reactions of the CE typically will depend on a plurality of factors. For one, the surface of the CE itself will have an influence, such as the surface area, the roughness of the electrode, and/or other surface properties. Further, the presence of redox species and the respective overpotential at the CE will influence the above-mentioned properties of the CE, as well as the concentration of the redox species and the redox potential and overvoltage of the process.

With respect to in vivo, continuous monitoring sensor elements, these sensors typically will be surrounded by a body fluid such as blood and/or interstitial fluid. As mentioned above, most known sensor elements use oxidation detection reactions at the WE in which the analyte, such as glucose, is oxidized. For example, glucose will be enzymatically oxidized, and reduced co-products will be generated, such as $H_2O_2$. Since most constituents of blood and interstitial fluid are present in a reduced form, the number of reducible species in typical in vivo measurements is limited. In the order of their respective redox potentials, the following reducible species are provided as examples: oxygen ($O_2$), $H_2O_2$ and water ($H_2O$). The amount of $O_2$ often is rather limited, specifically in in vivo measurements in interstitial fluid. By encapsulating the sensor element implanted into the body tissue, delivery of $O_2$ to the WE may further diminish over time. $H_2O_2$ may be generated by electrode reaction, such as by reduction of $O_2$ and/or by enzymatic reaction. Under in vivo conditions, $H_2O$ is widely available at high concentrations; however, using $H_2O$ as a reducible species includes forming hydrogen ($H_2$) gas, which may lead to a de-wetting of the electrode that will increase the above-mentioned effects. Further, the gas formation may lead to a lift-off of a membrane that can cover the WE and may even lead to a full removal of the membrane and/or the electrode.

The CE typically is made from a reducible material. Thus, redox materials such as Ag/AgCl systems are known, such as for a combined CE/RE. In these electrode systems, however, the amount of the redox material is limited, thereby limiting the life-cycle of the sensor element. In case the amount of the redox material is insufficient, the depletion of the redox material may lead to a failure of the measurement, such as a failure of the reference potential in a two-electrode setup, with all potential consequences. Thus, a validity of a calibration may fail or, in a worst case, the WE even may be destroyed. In an electrode setup including at least one RE (i.e., "three-electrode-setup"), the CE may have to change to a different redox process in case one or more redox materials are used up. In this case, the CE may even change to an invalid redox process for which the CE is not designed, specifically with regard to size and/or geometry. Still, from a practical point of view, it is typically not possible to increase the amount of the redox material at the CE at will. Thus, an increase of the redox material, such as an increase of Ag/AgCl, to increase the lifetime and/or capacity of the CE, may lead to a decreased biocompatibility of the sensor element. It is therefore preferable to make use of a redox species that is available in vivo and, thus, which is per se biocompatible.

For the foregoing reasons, there is a need for sensor elements, which are at least partially implantable into a body tissue, and which fully or partially avoid the short-comings of known sensor elements as discussed above. Specifically, the sensor elements shall provide improvements regarding the problem of unwanted, increased or inhomogeneous gas formation at one or more of the electrodes, as well as address the problem of a potential risk of an unwanted change of electrode potentials or even electrode destruction.

BRIEF SUMMARY

An inventive concept described herein includes sensor elements having improvements with respect to attenuating unwanted, increased or inhomogeneous gas formation at one or more of the electrodes, as well as attenuating a potential risk of an unwanted change of electrode potentials or even electrode destruction. This inventive concept is achieved by using certain electrode geometries in connection with covering corners and/or edges of the electrodes with an electrically insulating material to provide a more homogeneous distribution of an electric field when such sensor elements are used. When using the sensor elements as described herein, gas formation may be realized in a significantly more homogeneous way, such as by homogeneously distributing the gas formation over at least one electrode and, thereby allowing for an improved removal of this gas formation, such as by diffusion processes. Consequently, this inventive concept can be incorporated into exemplary sensor elements, especially implantable or at least partially implantable sensor elements, and methods of making and using the same as described in more detail below.

For example, sensor elements are provided for determining at least one analyte concentration in at least one body fluid sample, where the sensor elements are at least partially implantable into a body tissue. The sensor elements include a substrate and at least two electrodes.

The at least two electrodes can be at least one WE and at least one CE. Accordingly, the at least one WE includes at least one WE conductive pad applied to the substrate, where at least one electrically conductive WE sensor material is applied to the at least one conductive pad. In some instances, the electrically conductive WE sensor material can be at least one detector substance, such as at least one enzyme, adapted to perform an electrically detectable electrochemical detection reaction with an analyte of interest, such as glucose. Likewise, the at least one CE includes at least one CE conductive pad applied to the substrate.

The sensor elements also include at least one electrically insulating material that surrounds or alternatively circumferentially surrounds the CE on all sides, where a height of the electrically insulating material at least equals the height of the CE conductive pad. In some instances, the electrically insulating material forms at least one layer having at least one opening, where the CE conductive pad is located at least partially inside the opening. In other instances, the electrically insulating material covers an edge portion of the CE conductive pad. In still other instances, the electrically insulating material has at least one further opening for the WE, where the WE conductive pad is located at least partially inside the at least one further opening. Moreover, the portion of the WE conductive pad located inside the at least one further opening can be fully covered by the electrically conductive sensor material. Alternatively, the electrically insulating material covers an edge portion of the at least one electrically conductive sensor material.

In some instances, at least one of the WE conductive pad and/or the CE conductive pad is a metal pad, such as a gold pad.

In some instances, the sensor elements include a plurality of WE's.

In some instances, the CE further includes at least one electrically conductive CE sensor material, where the at least one electrically conductive CE sensor material fully or partially covers the CE conductive pad, and where the height of the electrically insulating material can be at least equal the height of the electrically conductive CE sensor material. In certain instances, the electrically insulating CE material covers an edge portion of the electrically conductive CE sensor material. In other instances, the electrically conductive CE sensor material can be at least one of a paste, such as a conductive paste or a carbon paste; or an ink, such as a conductive ink or a carbon ink. Alternatively or additionally, the electrically conductive CE sensor material can be at least one CE redox material adapted to perform at least one redox reaction and/or at least one electrically conductive material, where the CE redox material can be at least one of Ag/AgCl, $Hg/HgCl_2$, Au, Pt, Pd and/or C.

In some instances, the CE also includes at least one electron transfer interface that is in contact with at least one body fluid when in an implanted state. In such an instance, the height of the electrically insulating material is at least about equal to a height of the electron transfer interface.

In some instances, the sensor elements include a plurality of CE's.

In some instances, the sensor elements include and are at least partially covered by at least one semi-permeable membrane, where the semi-permeable membrane prevents the detector substance from migrating into the body fluid, yet is permeable to the at least one analyte of interest.

In some instances, the sensor elements further include at least one RE having at least one RE conductive pad and at least one electrically conductive RE material, where the electrically conductive RE material can be at least one RE redox material providing a known redox potential. In view thereof, the layer of the electrically insulating material described above can have at least one further opening for the RE, where the RE is located at least partially inside the further opening. Additionally, the electrically insulating material surrounds or alternatively circumferentially surrounds the electrically conductive RE material on all sides, where the height of the electrically insulating material at least equals the height of the electrically conductive RE material. In some instance, the RE redox material can be at least one of Ag/AgCl, Hg/HgCl$_2$, Hg/Hg$_2$SO$_4$ and/or Hg/HgO.

In some instances, the sensor elements have an elongated shape having a length and a width, where the length exceeds the width by at least a factor of about 10 or by at least a factor of about 20. In other instances, the length extends along an axis of longitudinal extension of the sensor elements. In certain instances, the length is about 0.5 mm to about 100 mm, and the width is about 0.1 mm to about 10 mm.

In some instances, the at least one WE and the at least one CE can be applied to opposing surfaces of the substrate. When applied to opposing surfaces of the substrate, a projection of the WE into a plane of the CE is overlapped by the CE. Moreover, the projections of the WE and the CE into a common plane can be arranged essentially symmetrically with respect to at least one axis of symmetry, where the at least one axis of symmetry can include at least one axis of longitudinal extension of the sensor element. Alternatively or additionally, the at least one axis of symmetry can include at least one axis perpendicular to the longitudinal extension of the sensor element. In some instances, one WE is located on a first side of the substrate and one CE is located on an opposing side of the substrate.

Alternatively, the sensor elements can have at least two CE's arranged on opposing sides of the WE, where the CE's are substantially equally spaced apart from the CE. In some instances, where in a direction of longitudinal extension of the sensor element, one of the CE's is located on each side of the WE, and where the CE's are equally spaced apart from the WE.

Alternatively still, the sensor elements can have at least two WE's, where in a direction of longitudinal extension of the sensor element, one of the WE's is located on each side of the CE, and where the WE's are equally spaced apart from the CE.

In some instances, the substrate has an elongated shape having an axis of longitudinal extension, where in a direction perpendicular to the axis of longitudinal extension, at least one of the WE and the CE are equally spaced apart from at least two lateral edges of the substrate.

In view of the foregoing, methods are provided for making the sensor elements described herein. The methods can include at least a step of applying an electrically conductive sensor material to a conductive pad of the sensor elements by at least one coating technique. In some instances, the coating technique can be a printing technique, such as screen printing, and/or a dispensing technique.

In some instances, the electrically conductive sensor material can be coated into openings of the electrically insulating material by the screen printing technique and/or the dispensing technique. In other instances, the electrically conductive sensor material can be applied as a paste.

These and other advantages, effects, features and objects of the inventive concept will become better understood from the description that follows. In the description, reference is made to the accompanying drawings, which form a part hereof and in which there is shown by way of illustration, not limitation, embodiments of the inventive concept.

BRIEF DESCRIPTION OF THE DRAWINGS

The advantages, effects, features and objects other than those set forth above will become more readily apparent when consideration is given to the detailed description below. Such detailed description makes reference to the following drawings, wherein.

Corresponding reference characters indicate corresponding parts throughout the several views of the drawings.

Figure 1:
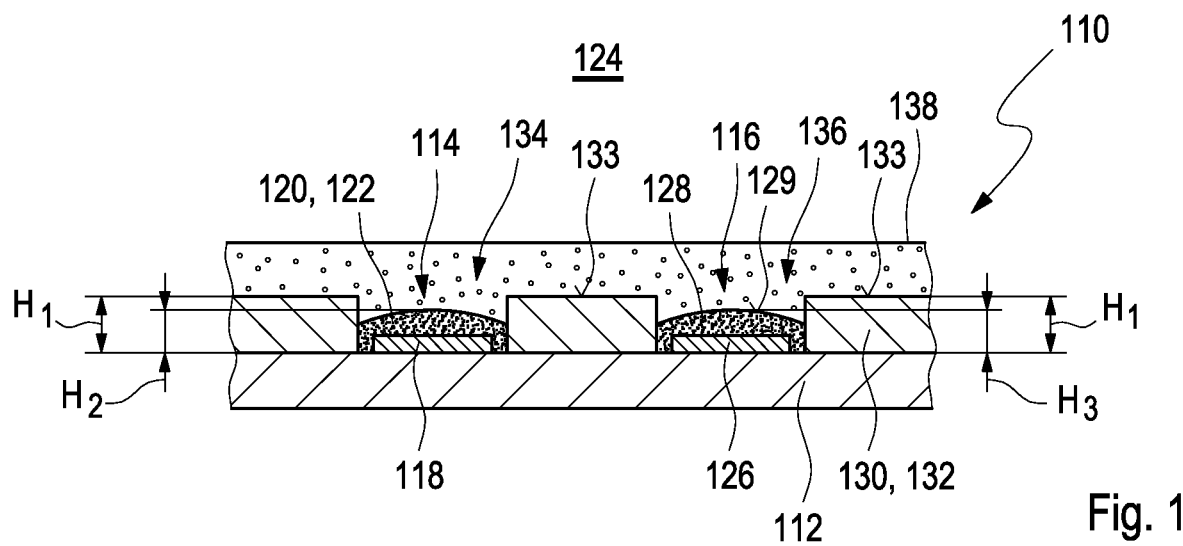
FIG. 1 shows a cross-sectional view of an exemplary sensor element.

While the inventive concept is susceptible to various modifications and alternative forms, exemplary embodiments thereof are shown by way of example in the drawings and are herein described in detail. It should be understood, however, that the description of exemplary embodiments that follows is not intended to limit the inventive concept to the particular forms disclosed, but on the contrary, the intention is to cover all advantages, effects, features and objects falling within the spirit and scope thereof as defined by the embodiments described herein and the claims below. Reference should therefore be made to the embodiments described herein and claims below for interpreting the scope of the inventive concept. As such, it should be noted that the embodiments described herein may have advantages, effects, features and objects useful in solving other problems.

DESCRIPTION OF EXEMPLARY EMBODIMENTS

The sensor elements and methods now will be described more fully hereinafter with reference to the accompanying drawings, in which some, but not all embodiments of the inventive concept are shown. Indeed, the sensor elements and methods may be embodied in many different forms and should not be construed as limited to the embodiments set forth herein; rather, these embodiments are provided so that this disclosure will satisfy applicable legal requirements.

Likewise, many modifications and other embodiments of the sensor elements and methods described herein will come to mind to one of skill in the art to which the disclosure pertains having the benefit of the teachings presented in the foregoing descriptions and the associated drawings. Therefore, it is to be understood that the sensor elements and methods are not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the disclosure pertains. Although any methods and materials similar to or equivalent to those described herein can be used in the practice or testing of the sensor elements and methods, the preferred methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one." Likewise, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. For example, the expressions "A has B," "A comprises B" and "A includes B" may refer both to a situation in which, besides B, no other element is present in A (i.e., a situation in which A solely and exclusively consists of B) or to a situation in which, besides B, one or more further elements are present in A, such as element C, elements C and D, or even further elements.

Overview

Exemplary sensor elements and methods of making the same are provided. The sensor elements can be used for measuring at least one analyte of interest that may be present in a bod fluid sample of a mammal, such as a human or non-human animal. The sensor elements permit a more homogenous gas formation and are based upon an inventive concept that includes certain electrode geometries in connection with covering corners and/or edges of the electrodes with an electrically insulating material.

The sensor elements are useful in a variety of applications. For example, the sensor elements are useful as diagnostic tools for measuring a at least one analyte of interest having clinical relevance in diagnosing and treating disease. The at least one analyte of interest may be one or more analytes that typically are present in a body and/or body fluid of a human or animal user, such as one or more metabolites. Example of such analytes include, but are not limited to, glucose, ketones, triglycerides, lactate, cholesterol and/or any other type of potential analyte that may be found in a body fluid.

The body fluid may be blood and/or interstitial fluid; however, the sensor elements can be used with other types of body fluids having or suspected of having the at least one analyte of interest. Without restricting further embodiments, the detailed description of the inventive concept in the following will mainly be disclosed in the context of blood glucose sensor elements.

The sensor elements and methods provide a large number of advantages over known sensor elements and manufacturing methods. For example, the CE may be fully or partially be made of a non-reducible material. Since, in vivo only a typical number of reducible reaction partners exists, such as $O_2$, $H_2O_2$ or $H_2O$, the electrode reaction at the CE typically will imply a gas formation, such as the formation of $H_2$ gas. By using the sensor elements as described herein, gas formation may be realized in a significantly more homogeneous way, such as by homogeneously distributing the gas formation over the CE and, thereby allowing for an improved removal of this gas formation, such as by diffusion processes. Even a membrane may be used, which fully or partially covers the CE. Thus, one or more membranes may be used for immobilizing the conductive sensor materials and/or the detector substance, such as for immobilizing an enzyme. Moreover, the membrane may assist in limiting diffusion of the at least one analyte of interest. Furthermore, the overall biocompatibility of the sensor elements may be increased by the membrane. By improving the electrode geometry, the membrane may even cover all of the electrodes, such as WE, CE and optionally, the at least one RE, which significantly improves and simplifies the manufacturing methods.

By using the arrangements described herein, gas formation may take place in a more homogeneous way and/or even at a distance from the WE and the RE, thereby generally avoiding or at least attenuating the above-mentioned problems of the gas formation including, but not limited to, de-wetting, interaction with the electrode process, electrical problems, or even a lifting-off of the membrane or the electrodes. Generally, gas formation may take place in a more homogeneous way, since, by covering the edges of the electrodes with the electrically insulating material, the overall electric fields at the electrodes may be designed in a significantly more homogeneous way as compared to conventional sensor elements. In this manner, at a given current, at each point of the CE the same amount of gas may be generated and removed. The electrically insulating material may form part of the substrate itself, which may fully or partially be made of the electrically insulating material. Additionally or alternatively, the at least one electrically insulating material may be applied to the substrate, such as by coating the substrate with one or more layers of the electrically insulating material. Thus, the electrically insulating material may include at least one electrically insulating resin.

The inventive concept disclosed herein is particularly advantageous in conjunction with elongated sensor elements, such as so-called needle-type sensors, and/or in conjunction with other in vivo sensors having a complex sensor geometry. In these complex sensor geometries, the WE and the CE typically are provided in a non-ideal geometry, strongly deviating from a plane-parallel geometry of the electrode surfaces generating a homogeneous electric field. Thus, specifically, in needle-type sensors, electrode configurations are used having significantly complex structures of the electric fields, having contorted electric fields and/or electric fields of a locally high density. Consequently, the density of the electric flux lines may be high in a region of corners, edges or other parts of the electrodes, leading to high variations in voltage drop at the CE. By using the above-mentioned electrode geometry that fully or partially covers these edges by the insulating material surrounding the electrically conductive sensor material of at least the WE and alternatively also of the CE, a more homogeneous distribution of the electric field may be provided. Consequently, by avoiding local areas having a high density of the lines of electric flux, the electrode reactions may be designed in a significantly more homogeneous way, thereby leading to a more homogeneous gas formation.

In connection with appropriate measuring methods, such as by using one or more potentiostatic measurements for a two-electrode setup or a three-electrode setup, the above-mentioned problems may be avoided. For example, the measuring method disclosed in WO Patent Application Publication No. 2007/071562 may be used. By rendering the electrode reactions, specifically at the CE, more homogeneous, the potentiostatic setup may control the potential of the CE such that a homogeneous current distributed over the electrode surface will flow, the current having a significantly increased homogeneity when compared to conventional sensor elements with uncovered corners and/or edges of the electrodes. Again, a more homogeneous gas formation may take place. Consequently, by using the inventive concept described herein, gas formation under the membrane and/or a de-wetting of the CE, causing a significantly increased current density on a decreasing surface, may be avoided. Similarly, perturbations of the current path in between the CE and the CE may be avoided, as well as perturbations of transport processes at the CE and the CE.

Further advantages of the present disclosure refer to sensor elements having a plurality of WE's and/or a plurality of CE's. Thus, changing geometries, such as sensor elements having alternating arrangements of WE's and CE's, may be realized. In conventional sensor elements, these changing geometries may lead to an unwanted situation in which the current flows over only one out of a plurality of potential current paths, thereby leading to a localized gas formation and/or other localized problems. By using the above-mentioned arrangements, thereby providing a more homogeneous distribution of the electric fields and/or current paths, these problems may be avoided. Consequently, a plurality of WE's may be provided on the same sensor element perimeter, thereby allowing for a tissue averaging of the measuring method without changing an angle of implantation of the sensor element. Specifically, by covering the edges of the WE, and optionally, the CE by using the electrically insulating material, a direct extension of electric flux lines from the edge of the WE to the edge of the CE or vice versa may be avoided, even if the WE and the CE are located adjacent to each other on the same surface of the sensor element. Consequently, only curved electric flux lines are possible, thereby providing a more homogeneous electric field, avoiding edge effects and leading to a more homogeneous distribution of the current density.

Sensor Elements

The inventive concept encompasses sensor elements for determining at least one analyte concentration in a body fluid sample, especially partially implantable or fully implantable sensor elements. The sensor elements include at least one substrate, at least two electrodes, where the electrodes may have corners and/or edges of the electrodes covered with an electrically insulating material to provide a more homogeneous distribution of an electric field when such sensor elements are used.

As used herein, "substrate" means a carrier element having an arbitrary shape, such as a strip-shape. The at least one substrate can be a flexible substrate and can have a layer setup including one, two or more layers, especially a flexible layer setup. The substrate can be made of any arbitrary substrate material, such as a plastic material, a laminate material, a paper material and/or a ceramic material. Alternatively or additionally, other materials may be used, such as metals or thin-film setups.

In addition to the substrate, the sensor elements include at least two electrodes. As used herein, "electrode" means an entity of the sensor elements adapted to contact the body fluid sample inside the body tissue, either directly or via at least one semi-permeable membrane. As such, the electrodes can be arranged so that they contact with at least one electrolyte contained in the body fluid, such as $H_2O$.

The electrodes may be applied to the same surface of the substrate or to different surfaces of the substrate. For example, the at two electrodes may be applied to opposing surfaces of the substrate so that at least one WE may be located on a first side of the substrate and at least one CE may be located on an opposing side of the substrate.

The electrodes may be or may include one or more electrode fields that fully or partially contact with the body fluid. Each electrode field may provide at least one interface with the body fluid (e.g., either directly contacting a body tissue containing the body fluid or contacting the body fluid via at least one membrane that may fully or partially be permeable for the body fluid or one or more components thereof). One or more of the electrode fields may be contacted via one or more appropriate contact leads, also known as conductive paths. Thus, one contact lead or conductive path may electrically contact precisely one electrode or a plurality of two or more electrodes. The electrodes may have exactly one continuous surface area adapted to contact the body fluid inside the body tissue.

Moreover, one or more electrodes of the same type may be provided in the sensor elements. Each electrode may be contacted electrically by at least one contact lead. When more than one electrode of the same type is provided, the electrodes may be contacted by one or more contact leads. Thus, two or more electrodes of the same type might be contacted electrically by one and the same contact lead. Alternatively, separate contact leads may be provided for contacting the electrodes, such as at least one separate contact lead per electrode.

The electrodes are configured so that an electrochemical reaction may take place at the electrode, where the body fluid or a part thereof, such as an electrolyte and/or the at least one analyte of interest, takes place in this electrochemical reaction. Thus, the electrode may be configured so that an oxidation reaction or a reduction reaction occurs at the electrodes.

The electrodes also include at least one conductive pad, which may be a metal pad. The electrodes, or at least one of the electrodes, include a multi-layer setup, having the at least one metal pad and, optionally, at least one additional layer partially or fully covering the metal pad. The at least one optional additional layer may be at least one electrode material as described in further detail below. The at least one metal pad may be one or more of the following metals: copper, gold, nickel and/or platinum. Additionally or alternatively, other metals may be used and are known in the art. Further, a multi-layer metal setup may be used in which the pad includes more than one metal, such as for improving an adhesion of the metal pad to the substrate. Additionally or alternatively still, other types of conductive pads may be used, such as organic conductive pads formed fully or partially by conductive polymers.

The metal pad of each electrode may be connected to one or more electrical wires, electrical vias and/or one or more electrical supply lines or conductor lines. In this manner, the conductive pad or metal pad may be connected to at least one contact pad of the sensor element adapted for connecting the sensor element to at least one measurement device, such as a hand-held measurement device interacting with the sensor element.

As noted above, the sensor elements include at least two electrodes, which can be at least one WE and at least one CE (i.e., a two-electrode setup). In addition, the sensor elements may include at least one RE (i.e., a three-electrode setup). In some instances, however, the RE may be combined with the CE, where the CE takes a double function (i.e., a two-electrode setup). See, e.g., WO Patent Application Publication No. WO 2007/071562.

As used herein, "working electrode" or "WE" means an electrode adapted for performing at least one electrochemical detection reaction for detecting the at least one analyte in a body fluid. Moreover, and as used herein, "counter electrode" or "CE" means an electrode adapted for performing at least one electrochemical counter reaction for balancing a current flow required by the detection reaction at the WE. Furthermore, and as used herein, "reference electrode" or "RE" refers to an electrode adapted for providing a widely constant electrode potential as a reference potential, such as by providing a redox system having a constant electrode potential.

In some instances, the sensor elements have only one WE, while in other instances may have a plurality of WE's. Similarly, the sensor elements may have only one CE, while in other instances may have a plurality of CE's. When a RE is included, the sensor elements likewise may have only one RE or may have a plurality of RE's. Like the at least one WE and the at least one CE, the RE's have at least one RE conductive/metal pad.

Figure 3:
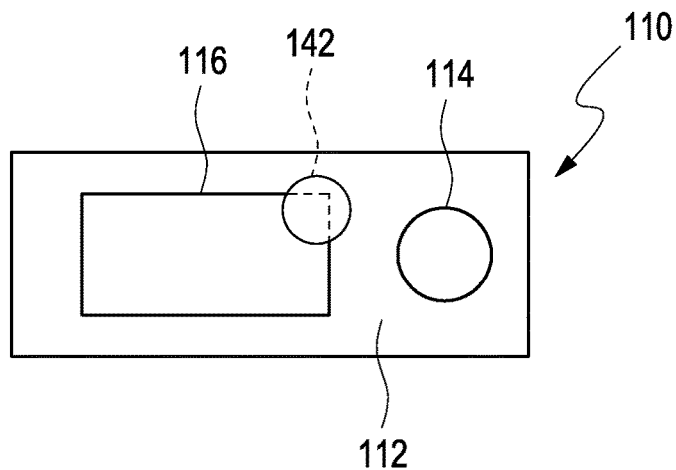
FIGS. 3A and 3B, in a similar view to FIGS. 2A and 2B, show the problem of inhomogeneous gas formation in conventional sensor elements without edge covering of the electrodes.
Figure 3:
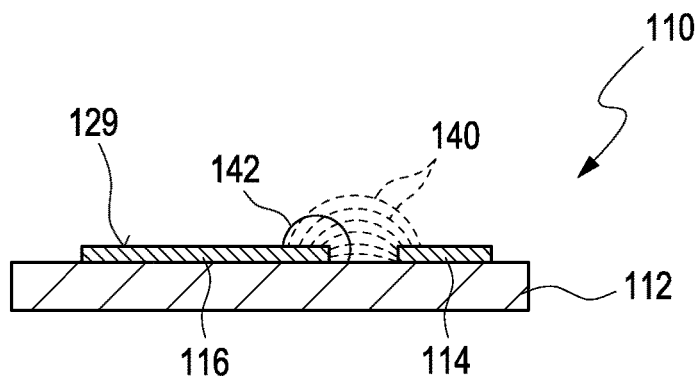

For measurement setups making use of the WE and the CE and, optionally, the RE, reference may be made to FIGS. 3A and 3B of WO Patent Application Publication No. 2007/071562, as well as the corresponding description of these figures. However, other setups are contemplated and are known in the art.

In some instances, the CE may be formed solely by the CE conductive pad. In this manner, in an implanted state of the sensor elements, a surface of the CE conductive pad may be in contact with the body fluid and may form an electron transfer interface that allows for a charge transfer between the CE conductive pad and the body fluid or vice versa. The CE conductive pad therefore can be fully or partially covered by at least one electrically conductive counter electrode material, a surface of the electrically conductive CE material facing away from the CE conductive pad and being in contact with the body fluid when the sensor element is in an implanted state to form the electron transfer interface or a part of the electron transfer interface. Thus, electron transfer interface may be an interface allowing for redox reactions.

As described in greater detail below, the CE conductive pad may be fully or partially covered by at least one electrically conductive CE material. Thus, one or more layers of the electrically conductive CE material may be coated onto the CE conductive pad. In this case, a surface of the electrically conductive CE material facing away from the CE conductive pad may form the electron transfer interface and may be in contact with the body fluid when the sensor elements are in an implanted state. As such, a charge transfer between the electrically conductive CE material and the body fluid or vice versa may take place, and/or redox reactions may take place at the interface between the electrically conductive CE material and the body fluid.

In some instances, and as also described in greater detail below, the electron transfer interface does not protrude from the electrically insulating material. Thus, the height of the electrically insulating material at least equals a height of the electron transfer interface. As used herein, "height of the electron transfer interface" means a maximum distance of the electron transfer interface protruding from the substrate. For example, in a direction perpendicular to the substrate, no point of the electron transfer interface protrudes further from the substrate than the electrically insulating material. As such, the electron transfer interface can be fully located within an opening of the electrically insulating material and/or within a depression therein. Again, electrically insulating material may fully or partially cover an edge portion or define an edge of the electron transfer interface.

The WE therefore includes at least one WE conductive pad applied to the substrate, especially at least one metal pad, as outlined above. In addition, the WE includes at least one electrically conductive WE sensor material. The at least one electrically conductive WE sensor material is applied to the WE conductive pad and includes at least one detector substance adapted to perform an electrically detectable electrochemical detection reaction with the at least one analyte of interest. Likewise, the CE includes at least one CE conductive pad applied to the substrate.

Examples of electrically conductive sensor materials are known in the art. See, e.g., WO Patent Application Publication No. 2007/071562, as well as other documents cited above. For example, the at least one electrically conductive sensor material may be at least one electrically conductive material such as a carbon (C) or manganese dioxide ($MnO_2$) paste. In some instances, the electrically conductive sensor material may be an electrically conductive matrix, such as a matrix made including $MnO_2$. Additionally or alternatively, the electrically conductive sensor material can include other types of conductive materials and/or non-conductive materials.

Moreover, the electrically conductive sensor material includes at least one detector substance for performing an electrically detectable electrochemical detection reaction with the at least one analyte of interest. Examples of detector substances include enzyme such as glucose oxidase (GOD) and/or glucose dehydrogenase (GDH), or an enzyme which, by itself and/or in combination with other components of the detector substance is adapted to perform an oxidation and/or reduction reaction with the at least one analyte of interest.

Furthermore, the electrically conductive sensor material can include one or more auxiliary components, such as one or more co-enzymes and/or one or more mediators adapted for an improved charge transfer from one component of the detection reaction to another component. Advantageously, $MnO_2$ may function as a mediator.

As used herein, "electrically detectable," when used in connection with the electrochemical detection reaction, means that by using an electric and/or electronic setup, the electrochemical detection reaction may be detected. Thus, for example, the electrochemical detection reaction may be detected by comparing one or more currents while the electrode potentials are constant, such as an electrical current of the WE with the electrical current of one or more further electrodes (i.e., the electrical current of the CE and/or of the RE). Additionally or alternatively, other electrical measurement methods may be used for detecting the electrochemical detection reaction, such as the measurement setups disclosed in WO Patent Application Publication No. 2007/071562 (e.g., by using the measurement setups disclosed in FIGS. 3A and 3B, as well as in the corresponding description of these figures).

In some instances, the electrically conductive sensor material may be formed by a paste, in a deformable or hardened state. As used herein, "paste" means an amorphous substance containing one or more particulate components, such as one or more conductive components and/or powders, as well as one or more binder materials, such as one or more organic binder materials. Specifically when using printing techniques, the electrically conductive sensor material may be formed by a printable paste, such as a paste adapted for screen-printing processes.

When at least one electrically conductive CE material is provided, generally, an arbitrary electrically conductive material or a mixture of electrically conductive materials may be used. For example, the electrically conductive CE material may be at least one of: a paste, such as a conductive paste, especially a carbon paste; an ink, such as a conductive ink, especially a carbon ink.

The electrically conductive CE material may include at least one CE redox material adapted to perform at least one redox reaction and/or may include one or more electrically conductive materials such as one or more metals. As used herein, "redox reaction" means that one partner of the redox reaction is reduced, whereas another partner of the redox reaction is oxidized. Thus, redox material refers to a material having at least one reducible component and at least one oxidizable component. Examples of redox materials include, but are not limited to, redox systems including Ag/AgCl and/or $Hg/HgCl_2$. The at least one electrically conductive CE material may be Au, C, Pd and/or Pt. The at least one electrically conductive material such as one or more of Au, Pt, Pd and C are used in three-electrode setups, only. The at least one electrically conductive material may provide at least one electrically conductive surface that is an electrically polarizable surface and is adapted such that one or more redox reactions with one or more components contained in the body fluid may take place, such as one or more of the following redox reactions: $O_2/H_2O$; $H_2O_2/H_2O$; $H_2O/H_2$.

In addition to the electrically conductive WE and/or CE sensor material, the sensor elements can include at least one electrically insulating material that may be applied to the substrate, such as by coating the substrate with one or more layers of the at least one electrically insulating material. Examples of electrically insulating materials include, but are not limited to, one or more electrically insulating resins. Thus, the substrate may be fully or partially coated with one or more layers of the electrically insulating resin. Additionally or alternatively, other types of insulating materials may be used to fully or partially cover the substrate. The electrically insulating material may be applied directly or indirectly to the substrate, such as by coating techniques. Additionally or alternatively, the electrically insulating material may be part of the substrate itself. Thus, the substrate itself may be fully or partially made of at least one electrically insulating material. For example, the substrate may be fully or partially made of an insulating plastic material such as an insulating polyester, may be fully or partially made of an insulating material such as paper, and/or may be fully or partially made of an insulating ceramic material.

As used herein, "electrically conductive" means an electric conductivity a, typically given in S/m or $1/\Omega m$ of at least about $1 \cdot 10^0$ S/m, of at least about $1 \cdot 10^3$ S/m, or of at least about $1 \cdot 10^5$ S/m. Likewise, and as used herein, "electrically insulating" means an electric conductivity of no more than about $1 \cdot 10^{-1}$ S/m, of no more than about $1 \cdot 10^{-2}$ S/m, or of no more than about $1 \cdot 10^{-5}$ S/m.

As used herein, "about" means within a statistically meaningful range of a value or values such as a stated concentration, conductivity, length, molecular weight, pH, sequence identity, time frame, temperature or volume. Such a value or range can be within an order of magnitude, typically within 20%, more typically within 10%, and even more typically within 5% of a given value or range. The allowable variation encompassed by "about" will depend upon the particular system under study, and can be readily appreciated by one of skill in the art.

When a separate insulating material is used, such as an insulating material forming one or more layers on top of the substrate, the electrically insulating material may be applied directly or indirectly to the substrate, such as by forming one or more layers that directly or indirectly contact the substrate and fully or partially cover the substrate. Thus, the electrically insulating material may contact the at least one substrate. Additionally or alternatively, in some regions, at least one additional layer may be interposed in between the electrically insulating material and the substrate, such as at least one electrically conductive feed line or other elements of the sensor elements.

The electrically insulating material may be one or more plastic materials and/or one or more inorganic electrically insulating materials. Examples of such insulating materials include, but are not limited to, a polycarbonate; a polyimide; a liquid crystal polymer (LCP); a polyurethane; a polystyrene; a polyethylene terephthalate; fiberglass-reinforced epoxy laminate, especially a flame-retardant fiberglass-reinforced epoxy laminate (i.e., FR4); and an electrically insulating photoresist.

The electrically insulating material surrounds or circumferentially surrounds the CE on all sides. As used herein, "surrounds" or "surrounding" means that the electrically insulating material is present along a borderline of a closed area that fully encompasses a CE surface area. Thus, in a top view onto the CE, the CE is surrounded by the electrically insulating material on all sides, such as in a plane or on a curved surface, whereas a surface of the CE inside an opening of the insulating material remains free. Thus, as outlined in further detail below, the electrically insulating material may form one or more windows (i.e., openings), where the CE is visible through the window. The borderline of the window, however, is fully defined by the electrically insulating material. Additionally or alternatively, specifically in case the substrate is fully or partially made of the electrically insulating material, the electrically insulating material may form at least one depression, wherein the CE may fully or partially be located within the at least one depression.

Additionally, a height of the electrically insulating material at least equals or even exceeds the height of the CE conductive pad. Thus, the electrically insulating material may cover the edges of the CE conductive pad. As used herein, "height" means a maximum extension of the electrically insulating material or the electrically conductive sensor material, respectively, in a direction perpendicular to the substrate. Additionally or alternatively, height means a height of the CE conductive pad at the edges. As such, the CE conductive pad does not protrude to a larger extent from the substrate than the electrically insulating material, at least in the region of the window encompassing the CE.

Moreover, when the CE includes at least one electrically conductive CE material, such as in case the CE conductive pad is covered by one or more layers of the electrically conductive CE material, the height of the electrically insulating material at least equals the height of the electrically conductive CE material. Thus, the electrically conductive CE material does not protrude from the electrically insulating material.

Furthermore, when the CE includes at least one electrically conductive CE material fully or partially covering the CE conductive pad, the at least one electrically conductive CE material may be located fully inside an opening of the electrically insulating material and/or may be fully located inside a depression formed within the electrically insulating material. Additionally or alternatively, the electrically insulating material may cover an edge portion of the electrically conductive CE material.

The sensor elements may further include one or more of the following optional arrangements. For example, the electrically insulating material, as outlined above, may form at least one layer having at least one opening, where the CE conductive pad may fully or at least partially be located inside the opening. In some instances, at least the portion of the CE conductive pad located inside the opening may fully be covered by the electrically conductive sensor material. Thus, as outlined above, the insulating material may provide one or more insulating layers having one or more windows/openings, where the CE conductive pad at least partially may be visible therethrough.

In addition, the electrically insulating material may cover an edge portion of the CE conductive pad. Thus, the electrically insulating material may overlap the edges of the CE conductive pad, whereas inside the window, the CE conductive pad remains free from the insulating material.

Similar arrangements for the electrically insulating material as outlined above for the at least one CE also may be realized for the at least one WE. As such, the electrically insulating material, such as the at least one layer of the electrically insulating material, may have at least one further opening for the WE. The WE conductive pad may be fully or partially located inside the further opening. Thus, one or more windows/openings may be provided in the electrically insulating material, where the at least one WE conductive pad may be fully or partially located inside the window/opening. Additionally or alternatively, the electrically insulating material may include one or more depressions, where the at least one WE conductive pad may be fully or partially located inside the at least one depression.

As used herein, "further opening" simply means an opening adapted to fully or partially accommodate the at least one WE, independent from any opening that may be provided for the at least one CE.

In case the at least one electrically insulating material has a further opening, where the WE conductive pad is fully or partially located within the further opening, the WE conductive pad of the working electrode may be located fully within the further opening. Additionally or alternatively, the at least one WE conductive pad and the electrically insulating material may be arranged such that the insulating material may cover an edge portion of the WE conductive pad.

Like the WE and CE, the at least one RE may include at least one electrically conductive RE material that additionally can include at least one reference redox material providing a known redox potential. As used herein, "providing a known redox potential" means that the reference redox material is capable of performing a redox reaction the potential of which is precisely defined. Additionally or alternatively, one or more other types of electrically conductive materials may be comprised, such as one or more metals and/or C.

When the sensor elements include at least one RE, the layer of the electrically insulating material may have at least one of the further opening for the RE, where the RE may be located at least partially inside the further opening. The above-mentioned geometric details of the insulating material also may refer to the at least one RE. Thus, the electrically insulating material may surround or alternatively circumferentially surrounds the electrically conductive RE material on all sides. In view thereof, the height of the electrically insulating material at least equals or even may exceed the height of the electrically conductive RE material.

The reference redox material may include one or more redox systems having a precisely defined redox potential. Similarly to the CE, the at least one reference redox material can be one the following redox systems: $Ag/AgCl$, $Hg/HgCl_2$, $Hg/Hg_2SO_4$ and/or $Hg/HgO$. Additionally or alternatively, other redox systems may be employed.

In some instances, at least a portion of the conductive pad located inside the further opening may fully or partially be covered by the electrically conductive sensor material. Further, the at least one electrically insulating material may fully or partially cover an edge portion of the electrically conductive sensor material.

As noted above, the sensor elements are at least partially implantable into a body tissue. As used herein, "at least partially implantable" means that at least a part of a sensor element, such as a specific front portion of the sensor element, may be implanted into a body tissue of a human or animal user. As used herein, "implantable" means that at least the part dedicated to implantation or insertion into the body tissue is biocompatible, at least over a specific time of use such as, for example, over several days, one week or even several weeks or months.

The sensor elements therefore may be fully or at least partially encapsulated by a biocompatible membrane, such as one or more of the membranes known in the art. See, e.g., WO Patent Application Publication Nos. 2005/078424 and 2007/071562.

Other methods for rendering the sensor elements fully or at least partially biocompatible are known. For example, the sensor elements may be covered by at least one semi-permeable membrane that prevents the detector substance from migrating into the body fluid. The semi-permeable membrane further may be permeable to the at least one analyte of interest. Further, the semi-permeable membrane may be permeable to at least one electrolyte contained in the body fluid, such as $H_2O$. With regard to potential membrane materials, reference again may be made to, for example, WO Patent Application Publication Nos. 2005/078424 and 2007/071562, as well as to US Patent Application Publication No. 2010/0230285. However, other types of membrane materials may be used, specifically polymer membrane materials, such as polyelectrolyte materials and/or hydrogel-materials.

The sensor elements generally have an arbitrary shape such as, for example, an elongated shape having a length and a width. Thus, the sensor elements may have a longitudinal axis or axis of longitudinal extension, along which the sensor elements extend. The sensor elements may be rigid or may be flexible or deformable. In some instances, the length of the sensor elements exceed the width by at least a factor of about 10 or even by at least a factor of about 20. As such, the sensor elements may be a needle-type sensor element and/or may include a strip-type sensor element.

Along the longitudinal axis of extension, the sensor elements may extend into the body tissue. As such, the sensor elements may have a length of about 0.5 to about 100 mm, of about 5 mm to about 20 mm, or of about 13 mm.

However, other lengths are possible, such as lengths less than about 13 mm. In use, the sensor elements may extend into the body by more than about 3 mm, by about 7 mm to about 10 mm, or even more.

The width of the sensor elements, such as a width perpendicular to a longitudinal axis of extension, may be about 0.1 mm to about 10 mm, about 0.2 mm to about 1 mm, or about 0.4 mm or about 0.7 mm. However, a width of less than about 0.5 mm or less than about 0.4 mm is possible.

As noted above, the at least two electrodes may be applied to the same surface of the substrate or to different surfaces of the substrate. For example, the WE and the CE may be applied to opposing surfaces of the substrate so that at least one WE may be located on a first side of the substrate and at least one CE may be located on an opposing side of the substrate. Thus, the substrate may have an elongated flat shape, where on one side of the elongated flat shape, the at least one WE is applied to the substrate and where, on an opposing side of the elongated flat shape, the at least one CE is applied to the substrate. When the WE and the CE are applied to opposing surfaces of the substrate, a WE projection into a plane of the CE is overlapped by the CE. Thus, when projecting the WE and the CE into a common plane, such as a plane of extension of the sensor element and/or a plane of extension of the substrate, the CE can fully overlap the WE projection. Stated differently, the WE projection may fully be located inside the CE projection.

Further aspects of the sensor elements refer to a symmetry of the location of the WE and the CE. For example, and as described above, the sensor elements may be configured so that the WE and the CE are applied to opposing surfaces of the substrate, where WE and CE projections into a common plane, such as into a plane of the substrate, are arranged essentially symmetrical with respect to at least one axis of symmetry. Thus, one, two or more axes of symmetry may be present, which may function as mirror axes. The WE and CE projections into the common plane may be symmetrical with regard to one and the same axis of symmetry and/or with regard to two axes of symmetry. Specifically, a mirror symmetry may be present. The at least one axis of symmetry may include at least one longitudinal extension of the sensor elements (i.e., a longitudinal axis of extension of the sensor element and/or an axis that is parallel to this axis of longitudinal extension of the sensor element). As used herein, "essentially symmetrical" means a perfect symmetry, where, within the tolerances of manufacturing, slight deviations from a perfect symmetry may be possible, such as deviations by no more than about 1 mm, by no more than about 0.5 mm, or by no more than about 0.02 mm.

Additionally or alternatively to the longitudinal extension of the sensor elements, a symmetry may exist with regard to at least one axis perpendicular to the lateral extension of the sensor elements.

For example, the sensor elements may include at least two CE's arranged on opposing sides of the WE or, in case a plurality of WE, of at least one of the WE's. Thus, as will be outlined in further detail below, the substrate may have an elongated shape with an axis of longitudinal extension. Along the axis of longitudinal extension, firstly, a CE may be arranged, followed by a WE, followed again by another CE. Further electrodes may be present. The CE's may be substantially equally spaced apart from the WE. As used herein, "substantially equally spaced apart" means that the distances between the CE's and the WE are equal within the tolerances of manufacturing. Thus, within the tolerances of manufacturing, the smallest distance between the first CE and the WE and the smallest distance between the second CE and the WE may be identical. As used herein, "smallest distance between the CE and the WE" means a distance between an edge of the CE closest to the WE and an edge of the WE closest to the CE. With regard to potential tolerances of manufacturing, reference may be made to the preceding paragraph. Thus, generally, the WE may be symmetrically surrounded by at least two CE's.

Alternatively stated, the sensor elements may include at least two CE's, where, in a direction of longitudinal extension of the sensor elements, one of the CE's is located on each side of the WE, where the CE's are equally spaced apart from the WE. Thus, two or more CE's may be located symmetrically on both sides of the WE.

Additionally or alternatively, with the substrate having an elongated shape with an axis of longitudinal extension, the sensor elements may include at least two WE's, where, in a direction of the longitudinal extension of the sensor elements, one of the WE's is located on each side of the CE, where the WE's are equally spaced apart from the CE. Thus, two or more WE's may be located symmetrically on both sides of the CE.

In certain instances, the symmetrical placement of at least two CE's with regard to the WE and/or the symmetrical placement of at least two WE's with regard to the CE may be realized so that the electrodes are placed within placement tolerances. Such placement tolerances can be less than about 100 µm in each direction, of no more than about 50 µm in each direction, or of no more than about 20 µm in each direction.

As noted above, the sensor elements may have a width in a dimension perpendicular to this axis of longitudinal extension. In this direction of the width of the sensor elements, the WE and the CE each are equally spaced apart from at least two lateral edges of the substrate. For example, the WE may equally be spaced apart from a first lateral edge of the substrate and a second lateral edge of the substrate. Similarly, the CE may equally be spaced apart from the first lateral edge of the substrate and the second lateral edge of the substrate. Thus, in both directions perpendicular to the axis of longitudinal extension, the WE may equally be spaced apart from the lateral edges of the substrate. Similarly, in these two directions perpendicular to the axis of longitudinal extension, the CE may equally be spaced apart from the lateral edges of the substrate.

Methods

In addition to the sensor elements, the inventive concept encompasses methods of making the test elements. The methods can include the steps described herein, and these steps may be, but not necessarily, carried out in the sequence as described. Other sequences, however, also are conceivable. Furthermore, individual or multiple steps may be carried out either in parallel and/or overlapping in time and/or individually or in multiply repeated steps. Moreover, the methods may include additional, unspecified steps.

The methods may begin by providing a substrate material as described above having at least one WE conductive pad thereupon and applying an electrically conductive WE sensor material to the WE conductive pad by at least one coating technique. Consequently, the methods may include one or more coating steps, using the at least one coating techniques, where during the at least one coating step the electrically conductive WE sensor material is applied to the WE conductive pad. The WE conductive pad may be fully or partially covered by the electrically conductive WE sensor material during this step.

The methods also can include applying an electrically conductive CE material to at least one CE conductive pad provided on the substrate material by at least one coating technique. Like the WE conductive pad, the CE conductive pad may be fully or partially covered by the electrically conductive CE sensor material during this step.

The applying/coating steps may be carried out by any suitable technique. Examples of applying/coating techniques include, but are not limited to, a printing technique and a dispensing technique. The printing technique may be an arbitrary printing technique, such as screen printing, ink-jet printing, stencil printing, offset printing, tampon printing or any other printing technique or any arbitrary combination thereof.

During the applying/coating step, the electrically conductive sensor materials may be applied in an amorphous form, such as a paste or liquid, which typically is followed by at least one drying step.

The electrically conductive sensor materials alternatively may be coated into one or more openings of an electrically insulating material on the substrate, such as by at least one of a printing technique and a dispensing technique, such as by screen printing. Additionally or alternatively, the electrically insulating material may be applied after coating with the electrically conductive sensor materials, such as after printing and/or dispensing of the electrically conductive WE sensor material and/or the electrically conductive CE material, respectively.

The methods also can include providing the at least one substrate, providing the at least one WE conductive pad, providing the at least one CE conductive pad on the substrate and/or applying a detector material.

EXAMPLES

The inventive concept will be more fully understood upon consideration of the following non-limiting examples, which are offered for purposes of illustration, not limitation.

FIG. 1 shows a cross-sectional view of an exemplary sensor element 110 that incorporates the inventive concept disclosed herein. The cross-section may be shown in a cross-sectional plane along a longitudinal axis of extension of the sensor element 110.

The sensor element 110 includes at least one substrate 112. The sensor element 110 also includes at least one WE 114 and at least one CE 116. The WE 114 includes a WE conductive pad 118, such as a metal pad, and at least one electrically conductive WE material 120 that fully or partially covers the WE conductive pad 118.

The electrically conductive WE material 120 includes at least one detector substance 122, as outlined in further detail above. The detector substance 122 is adapted to perform an electrically detectable electrochemical detection reaction with at least one analyte of interest to be detected by the sensor element 110 in a body fluid 124 in a body tissue of a human or an animal user surrounding the sensor element 110.

The CE 116 includes at least one CE conductive pad 126 and optionally may include one or more electrically conductive CE materials 128, such as Ag/AgCl or $Hg/HgCl_2$. In any case, a surface of the CE 116 facing away from the substrate 112 may be in contact with a body fluid or a part thereof, when the sensor element 110 is in an implanted state.

When implanted, the uppermost surface of the CE can form an electron transfer interface, which, in FIG. 1 is denoted by reference number 129. Thus, and as shown in FIG. 1, the upper surface of the electrically conductive CE material 128 or a part thereof, which may be in contact with the body fluid, forms the electron transfer interface 129. When no electrically conductive CE material 128 is deposited on top of the CE conductive pad 126, the electron transfer interface 129 may be formed by the top surface of the CE conductive pad 126. Alternatively, the CE conductive pad 126 is only partially covered by the electrically conductive CE material 128. In this case, the electron transfer interface 129 may partially be formed by a top surface of the electrically conductive CE material 128 and may partially be formed by a surface area of the CE conductive pad 126 that is not covered by the electrically conductive CE material 128.

The sensor element 110 also can include at least one electrically insulating material 130, which forms one or more electrically insulating layers 132. The electrically insulating layer 132 can have a plurality of openings 134, 136, also referred to as a "window," which may define an accessible area of the WE 114 and the CE 116, respectively. As schematically depicted in FIG. 1, the height of the electrically conductive WE material 120 and the height of the electrically conductive CE material 128 should not exceed the height of the electrically insulating layer 132. In FIG. 1, the height of the electrically insulating material 130 is denoted by $H_1$, whereas the height of the electrically conductive WE material 120 is denoted by $H_2$. As can be seen, $H_1$ at least equals $H_2$ or alternatively exceeds $H_2$. Similarly, the height $H_1$ of the electrically insulating material 130 at least equals a height $H_3$ of the electron transfer interface 129. Thus, the electron transfer interface 129 does not protrude from the electrically insulating material 130, and the electron transfer interface 129 is below a top surface 133 of the electrically insulating material 130 surrounding the CE 116, at least in the region of the respective CE 116. Similarly, the electrically conductive WE material 120 does not protrude from the electrically insulating material 130 surrounding the WE 114, and a top surface of the electrically conductive WE material 120 is below a top surface 133 of the electrically insulating material 130 surrounding the WE 114, at least in the region of the respective WE 114.

The sensor element 110 also can include at least one membrane 138, which at least may cover the WE 114 and which, as depicted in FIG. 1, also may fully or partially cover the CE 116. The membrane 138 is a semi-permeable membrane that allows for diffusion of the at least one analyte of interest from the body fluid 124 to the detector substance 122 and for a diffusion of an electrolyte from the body fluid 124 to the WE 114 and/or the CE 116, whereas the detector substance 122 and/or the electrically conductive sensor material 120 are kept back in the working electrode 114. With or without the membrane 138, the body fluid 124 or a part thereof may reach the CE 116. In the context of the present disclosure, no distinction is made between instances in which the body fluid 124 may fully reach the CE 116 and instances in which part of the body fluid 124 is retained by the membrane 138, whereas other parts of the body fluid 124 reach the CE 116.

Figure 2:
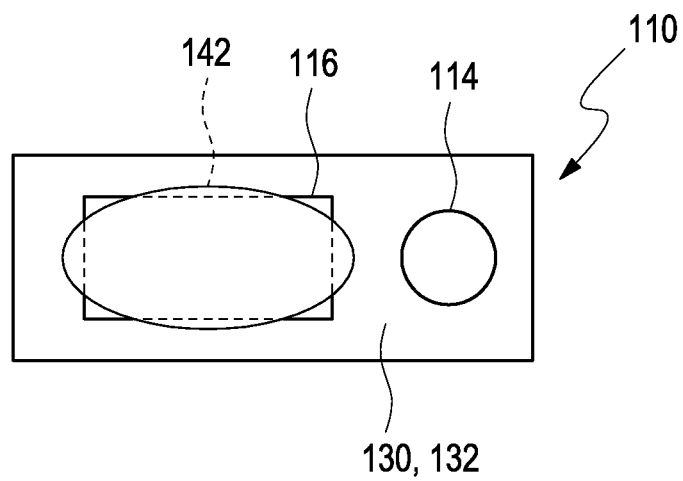
FIGS. 2A-B show in a top view (FIG. 2A) and in a cross-sectional view (FIG. 2B) a gas formation and a homogeneous distribution of electric flux lines in a sensor element.
Figure 2:
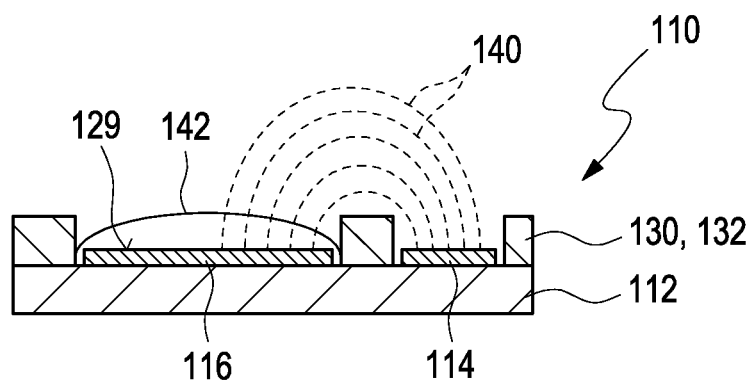

FIGS. 2A and 3A show a top view of an exemplary sensor element 110 with the electrically insulating material 130 (FIG. 2A), and an exemplary sensor element 110 without the electrically insulating material 130 (FIG. 3A). Likewise, FIG. 2B shows a side view of the sensor element 110 of FIG. 2A, and FIG. 3B shows a side view of the sensor element 110 of FIG. 3A.

In FIGS. 2B and 3B, electrical flux lines 140 are schematically depicted for both sensor elements. Thus, in the sensor element 110 depicted in FIG. 2B, at the edges of the electrodes 114, 116, the electric flux lines 140 are blocked by the electrically insulating material 130. Consequently, edge effects with a high density of the electric flux lines 140 are prevented, as opposed to the sensor element depicted in FIG. 3B without the electrically insulating material 130. In this case, a high density of electric flux lines 140 may be recognized in between the edges of the electrodes 114, 116.

Gas formation, denoted by reference number 142, may be different in both sensor elements. Thus, in the setup depicted in FIGS. 2A and 2B, a homogeneous gas formation 142 may take place, which may evenly be distributed across the CE 116. Conversely, in the setup depicted in FIGS. 3A and 3B, gas formation may take place in a rather punctual manner, providing a huge gas bubble rather than an evenly distributed gas film over the CE 116. In particular, the gas formation 142 depicted in FIG. 3A, generating one or more localized gas bubbles, may lead to destruction of one or more of the electrodes 114, 116 and/or to lift-off of the membrane 138 (not depicted).

A comparison of FIGS. 2A-2B to FIGS. 3A-3B clearly shows the effect of the present inventive concept in rendering the density of the electric flux lines 140 and/or the density of the electric current across the electrodes 114, 116 more homogeneous, thereby homogeneously distributing gas formation 142 and preventing destruction of the sensor element 110 or other problems of inhomogeneous gas formation, as outlined in further detail above.

Figure 4:
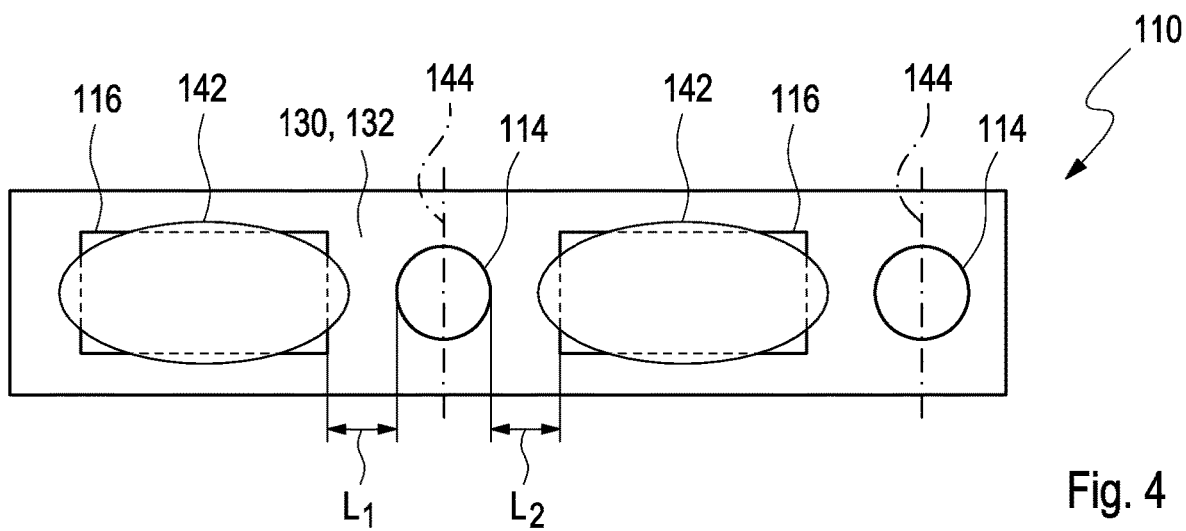
FIG. 4 shows an exemplary sensor element having a plurality of WE's and a plurality of CE's with a distribution of gas formation.
Figure 5:
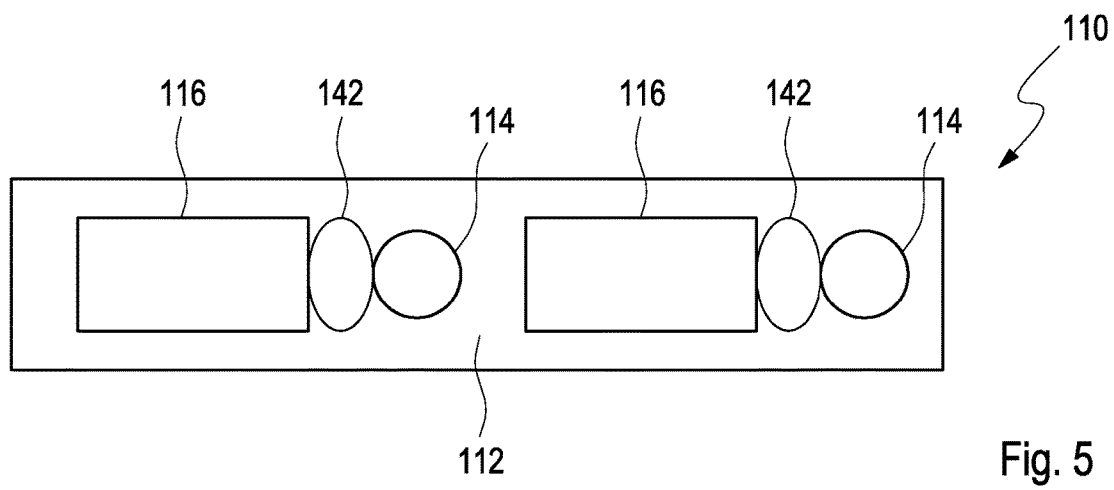
FIG. 5 shows the problem of inhomogeneous gas formation in exemplary sensor elements without edge covering of the electrodes.

FIGS. 4 and 5 show an exemplary sensor element 110 having a plurality of alternating WE's 114 and CE's 116 in a setup incorporating the present inventive concept having the electrically insulating material (FIG. 4) and in a setup without the electrically insulating material 130 (FIG. 5).

As shown in FIG. 4, the sensor element 110 incorporating the present inventive concept, besides the electrically insulating layer 132, further shows a symmetry of two CE's 116 with regard to an axis of symmetry 144. Thus, at least the left one of the WE's 114 is equally spaced apart from two CE's 116, one on the left hand side of axis of symmetry 144 and one on the right hand side of axis of symmetry 144. In addition to the effect of the electrically insulating material 130 as outlined above, this symmetry further enhances a uniformity of the current density and/or the electric flux lines 140 (not depicted in the FIGS.). As such, in the symmetrical setup of FIG. 4, a uniform distribution of gas formation 142 takes place since electric flux lines 140 are evenly distributed to the right and to the left. Contrarily, in the asymmetrical setup according to FIG. 5, a localized gas formation 142 occurs between the WE 114 and the nearest CE 116. Thus, by locating at least two CE's symmetrically with regard to a corresponding WE and/or by locating at least two WE's symmetrically with regard to one CE and thereby introducing a specific symmetry, a more uniform gas formation may be evoked.

Moreover, the setup of the exemplary sensor element 110 of FIG. 4 includes two CE's 116 being arranged on opposing sides of one WE 114. Further, the CE's 116 are substantially equally spaced apart from the WE 114. As such, the CE's 116 may be equally spaced apart from the WE 114 or from one of the WE's 114, within the tolerances of manufacturing. Thus, generally, deviations by no more than about 1 mm, by no more than about 0.5 mm, or by no more than about 0.02 mm may be tolerated. When referring to the distances, reference is made to the smallest distances of the respective electrodes 114, 116. In FIG. 4, the distance between the left CE 116 and the WE 114 is denoted by $L_1$, whereas the distance between the right CE 116 and the WE 114 is denoted by $L_2$. Within the tolerances of manufacturing, $L_1$ can equal $L_2$. The distance between the WE 114 and the CE 116 is defined by the minimum distance of the facing edges of the respective WE 114 and the CE 116.

When more than one WE 114 is arranged on the substrate, especially on the same side of the substrate, each WE 114 is neighbored by a respective pair of CE's 116, and the distances $L_1$, $L_2$ between each WE 114 and the respective neighbored pair of CE's 116 are equal within the tolerance of fabrication for each WE. In particular, all of the WE-CE distances on the substrate are equal within the tolerance of fabrication.

Figure 6:
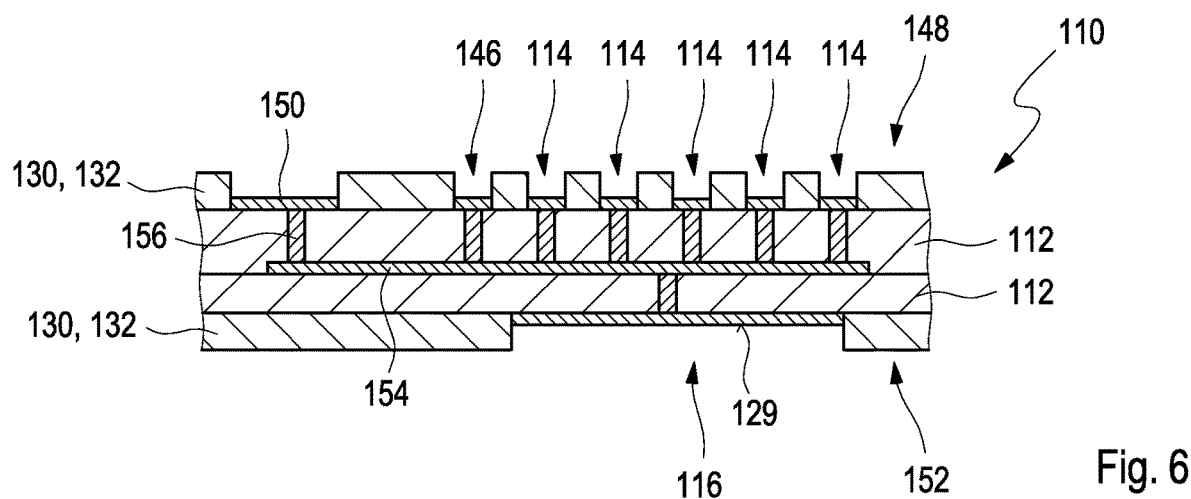
FIG. 6 shows a multi-layer setup of an exemplary sensor element having electrodes on opposing sides.

FIG. 6 shows a cross-sectional side view of another exemplary sensor element 110 incorporating the inventive concept. Here, a RE 146 and a plurality of WE's 114 are located on a first surface 148 of a substrate. Further, at least one contact pad 150 may be located on this first surface 148. On a second surface 152, opposing the first surface 148, at least one CE 116 is provided. The WE's 114, the RE 146 and the CE 116 are circumferentially surrounded by an electrically insulating material 130. The electrically conductive WE sensor material 120 is not shown in FIG. 6. Further, the optional electrically conductive CE sensor material 128 is not shown. Thus, the electrodes 114 and 116 are only shown in a schematic fashion.

The sensor element 110 shown in FIG. 6 also can include a multi-layer setup having an inner layer of conducting paths 154 and a plurality of electrical vias 156 connecting the conducting paths 154 to the appropriate electrodes 114, 116, 146 or to the contact pad 150.

In addition covering the edges of the electrodes 114, 116 with the electrically insulating material 130, as disclosed in the context of the sensor elements discussed above, the location of the electrodes 114, 116 on opposing surfaces 148, 152 of the substrate 112 prevents a direct edge-to-edge interconnection of the edges of the electrodes 114, 116 by electric flux lines 140 and, thus, prevents a localized high current density at these edges, in conjunction with preventing a localized increase of gas formation. Consequently, by using electrodes on opposing surfaces of the substrate 112, the above-mentioned effect of a more homogeneous gas formation on one or more of the electrodes 114, 116 may further be supported. Further, by placing electrodes 114 and 116 on opposing surfaces 148 and 152, the distance between the WE's 114 and the CE's 116 may be increased. Consequently, the above-mentioned effect may further be emphasized, and gas formation by increased electrical fields may be avoided by spatially separating electrodes 114 and 116 as far as possible.

Figure 7:
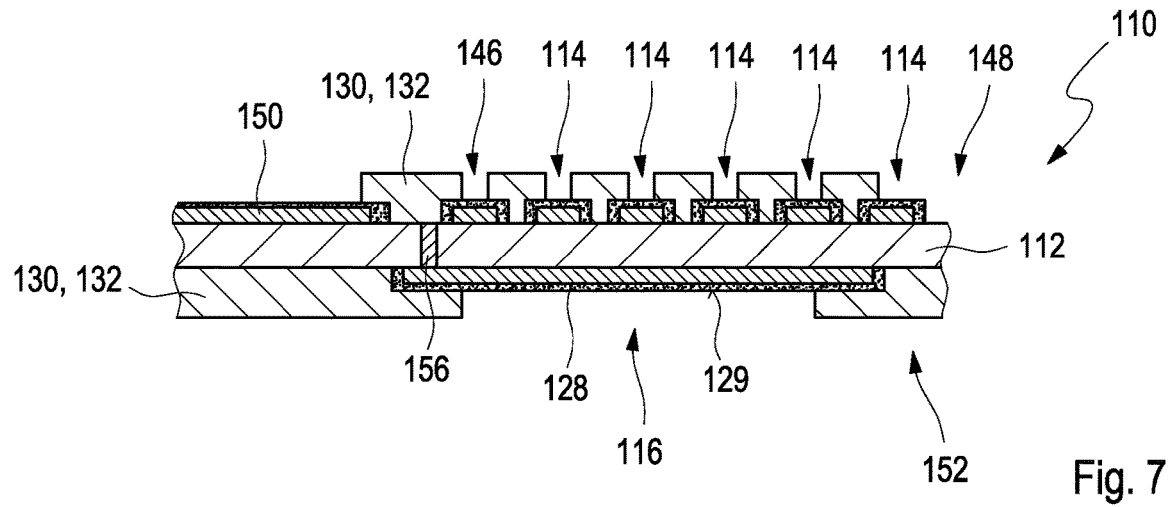
FIG. 7 shows an alternative, exemplary sensor element having electrodes on opposing sides.

FIG. 7 shows a layer setup of another exemplary sensor element 110 incorporating the inventive concept in a similar view to FIG. 6 but including slight modifications to the setup. Thus, instead of using a multi-layer substrate 112, a single layer substrate 112 may be used, including one or more vias 156. Thus, the layer setup may be significantly simplified in terms of complexity. Again, as in FIG. 6, the CE 116 optionally may include an electrically conductive CE sensor material 128.

Figure 8:
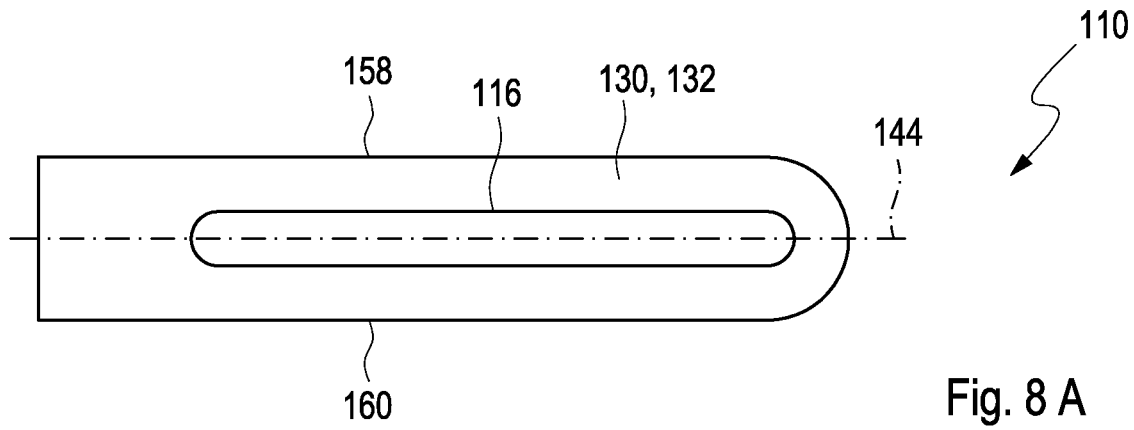
FIGS. 8A-E show different views of another exemplary sensor element having electrodes on opposing sides.
Figure 8:
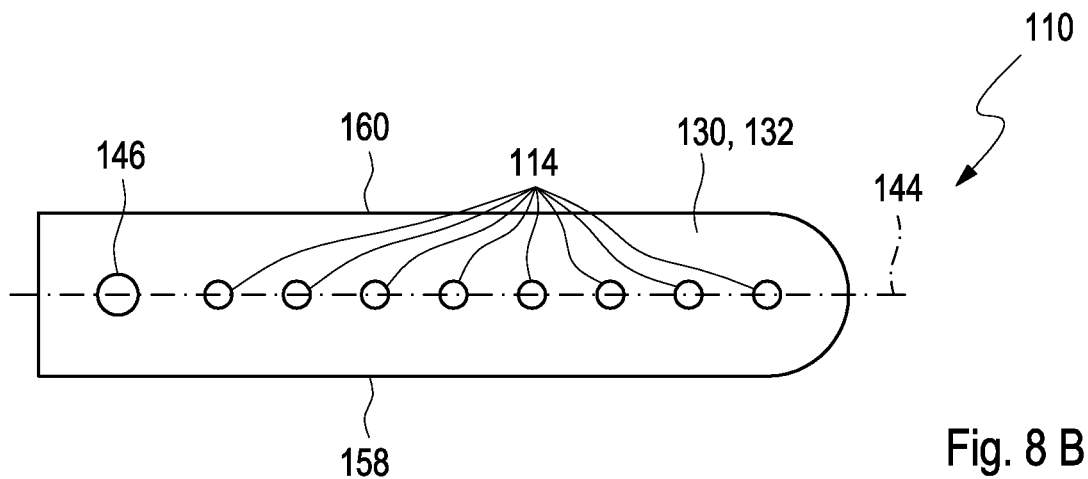
Figure 8:
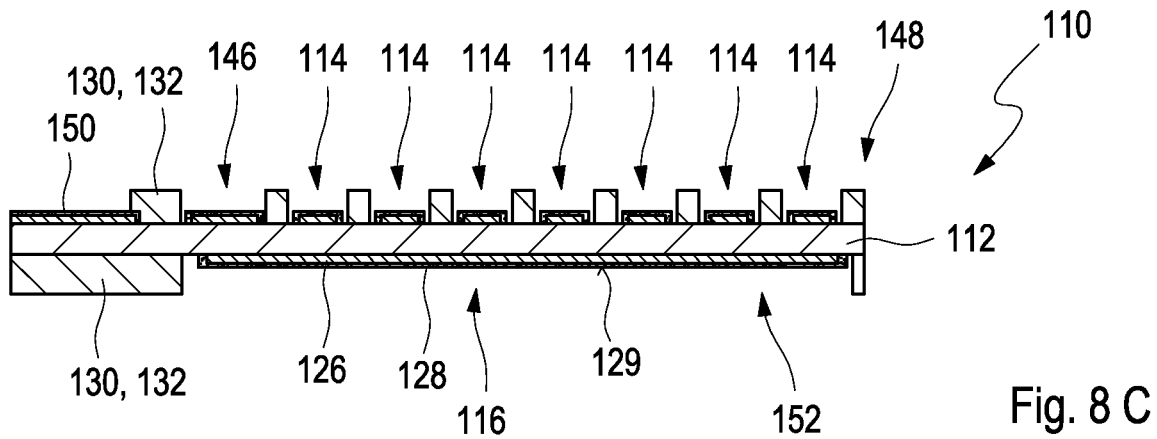
Figure 8:
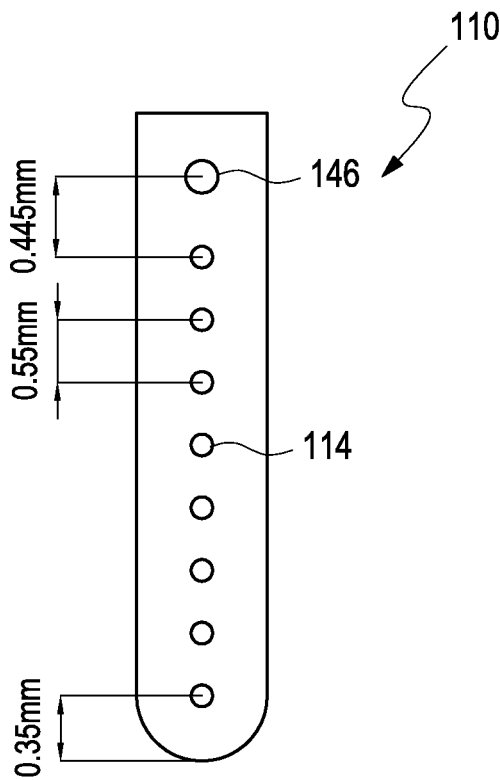
Figure 8:
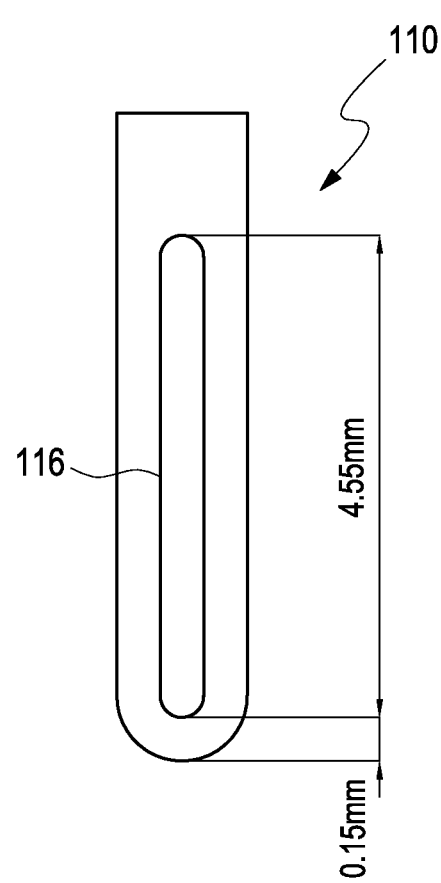

FIGS. 8A to 8E show different views of a potential setup of an exemplary sensor element 110 incorporating the inventive concept, such as the sensor element 110 of FIG. 7. Specifically, FIG. 8C shows a cross-sectional view, whereas FIGS. 8A and 8E show a top view of the second surface 152 including the CE. Likewise, FIGS. 8B and 8D show a top view of the first surface 148, including the RE 146 and the WE's 114, and also show potential dimensions of the setup.

Firstly, and as can be seen by comparing FIGS. 8A and 8B, all electrodes in are arranged symmetrically with regard to an axis of symmetry 144, which runs parallel to an axis of longitudinal extension of the sensor element 110. Thus, CE 116 can be equally spaced apart from both lateral edges 158, 160 of the sensor element 110, and, similarly, WE's 114 are equally spaced apart from these lateral edges 158, 160. As explained above with regard to the symmetry in FIG. 4, this measure of introducing a symmetry in the location of the electrodes 114, 116 may further help to render the electric fields, the density of the electric flux lines 140 and the current densities more homogeneous over the electrodes 114, 116, thereby preventing a strongly localized gas formation.

Further, and when gas formation takes place at the CE 116, the CE 116, in a projection of the WE's 114 and the CE 116 into a common plane, may overlap the CE's 116 on all sides. Thus, when projecting the WE's 114 into a plane of the CE 116, the WE's 114 can be fully located inside the CE 116. Additionally or alternatively, the CE 116, in this projection, in each direction of the plane, can overlap edges of the WE's 114 by at least about 100 µm or by at least about 200 µm.

The above-mentioned placements and symmetries shall be understood within specific tolerances of placement, which, typically, are determined by manufacturing and layout techniques. Thus, the at least one WE 114 and the at least one CE 116 can be placed within placement tolerances of no more than about 100 µm, of no more than about 50 µm, and of no more than about 20 µm.

Figure 9:
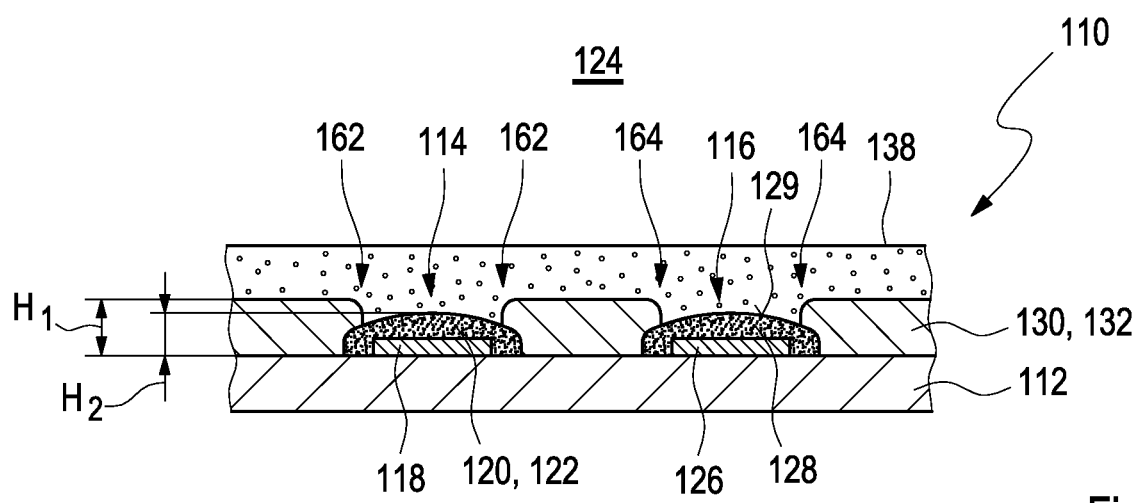
FIG. 9 shows another exemplary sensor element having an insulating material overlapping the electrically conductive WE and CE sensor materials.

FIG. 9 shows another exemplary sensor element 110 incorporating the inventive concept. At first glance, the sensor element 110 corresponds to the sensor element shown in FIG. 1 so that reference may be made thereto; however, when compared to the sensor element shown in FIG. 1, the electrically insulating material 130 overlaps the electrically conductive WE material sensor 120 in an edge region 162, also referred to as an overlap region, thereby further covering the edges of the WE 114 and preventing the abovementioned unwanted edge effects. Similarly, the electrically insulating material 130 may overlap part of the CE 116, in an edge region 164, such as the electrically conductive CE sensor material 128.

Figure 10:
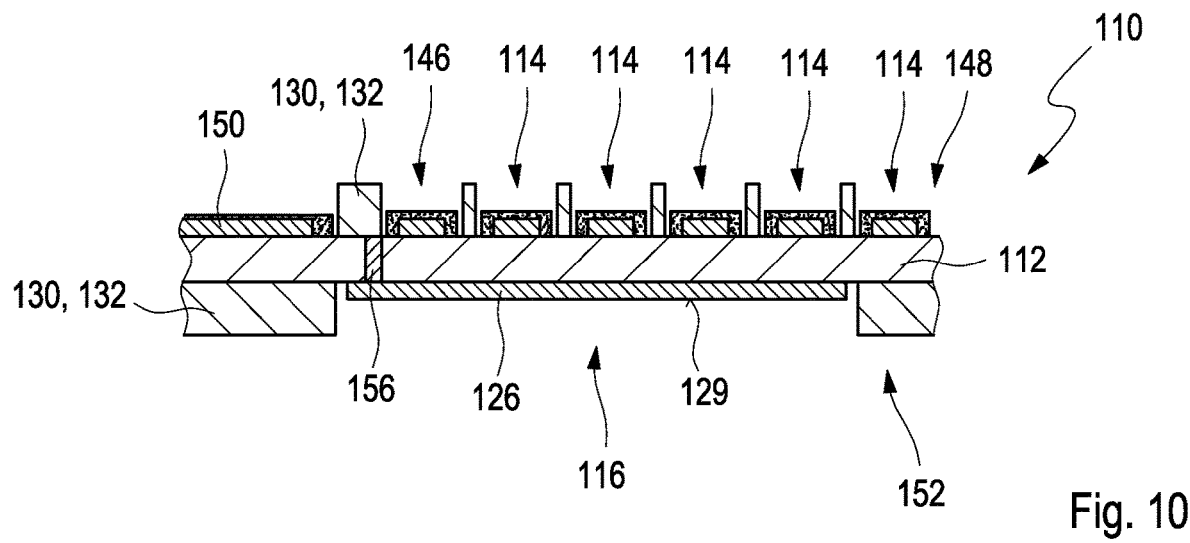
FIGS. 10 and 11 show alternative sensor elements having electrodes on opposing sides.

FIG. 10 shows a modification of the arrangement shown in FIG. 8C. Again, sensor element 110 includes a layer setup having the WE's 114 and the RE 146 on a first surface 148 of the substrate 112, and at least one CE 116 on the opposing, second surface 152. As shown in FIG. 10, the CE conductive pad 126 may be uncovered by electrically conductive CE sensor material 128. Thus, the free surface of the CE conductive pad 126 may form the electron transfer interface 129 that, in an implanted state, contacts the body fluid 124 and/or a part thereof. Furthermore, the edges of the electrodes 114, 116 and 146 may remain free and uncovered by the electrically insulating material 130. Similar to the arrangements shown in FIGS. 6-7, one or more vias 156 may be provided penetrating the substrate 112, thereby allowing electrical contact to the CE 116 on the first surface 148.

Figure 11:
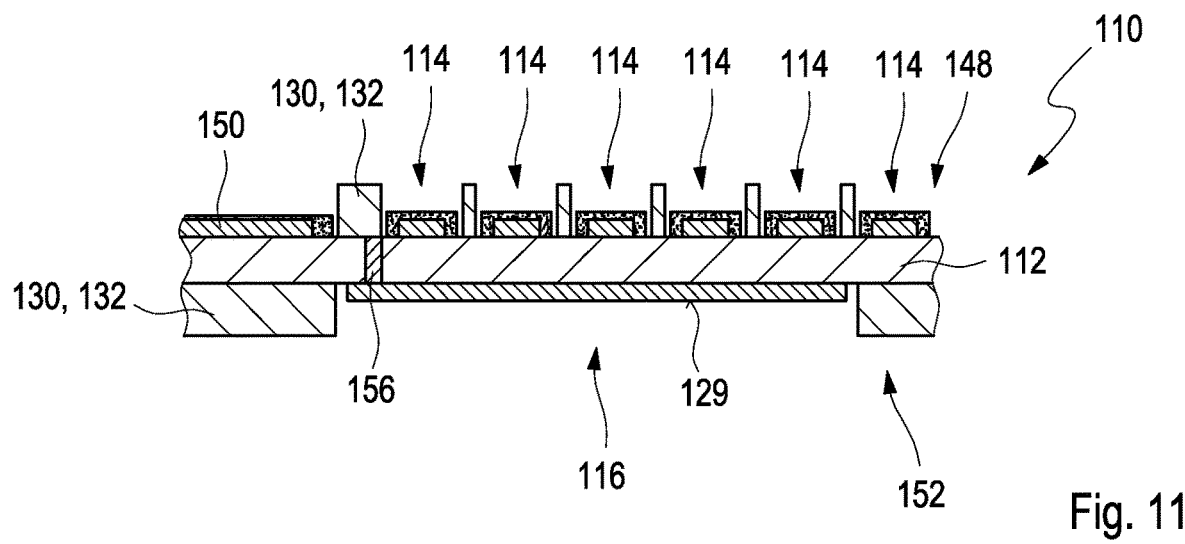

FIG. 11 shows a modification of the sensor element shown in FIG. 10. Here, the at least one RE 146 is replaced by at least one further WE 114 on the first surface 148. Further, the at least one CE 116 on the second surface 152 may be provided without an electrically conductive CE sensor material 128 or may be provided with an electrically conductive CE sensor material 128 as depicted in FIG. 7.

The exemplary sensor elements and electrode arrangements demonstrate that various geometric setups are feasible. The design details may be combined in any feasible way as one of skill in the art would recognize.

In general, the electrically conductive WE sensor material 120 may fully or partially be applied to the substrate 112 by using at least one coating technique, such as by using at least one printing technique (such as screen printing and/or other types of printing techniques) and/or by using at least one dispensing technique. Thus, the electrically conductive WE sensor material 120 may be formed by at least one paste that may be applied to the substrate 112 by a screen printing technique, a stencil printing technique, and/or by a dispensing technique. Other types of coating techniques, such as other types of printing techniques, may be applied additionally or alternatively.

All of the patents, patent applications, patent application publications and other publications recited herein are hereby incorporated by reference as if set forth in their entirety.

The present inventive concept has been described in connection with what are presently considered to be the most practical and preferred embodiments. However, the inventive concept has been presented by way of illustration and is not intended to be limited to the disclosed embodiments. Accordingly, one of skill in the art will realize that the inventive concept is intended to encompass all modifications and alternative arrangements within the spirit and scope of the inventive concept as set forth in the appended claims.

LISTING OF REFERENCE NUMBERS

110 Sensor element
112 Substrate
114 Working electrode
116 Counter electrode
118 Working electrode conductive pad
120 Electrically conductive working electrode sensor material
122 Detector substance
124 Body fluid
126 Counter electrode conductive pad
128 Electrically conductive counter electrode material
129 Electron transfer interface
130 Electrically insulating material
132 Electrically insulating layer
133 Top surface
134 Opening
136 Opening
138 Membrane
140 Electric flux lines
142 Gas formation
144 Axis of symmetry
146 Reference electrode
148 First surface
150 Contact pad
152 Second surface
154 Conducting paths
156 Via
158 Lateral edge
160 Lateral edge
162 Edge region
164 Edge region

The invention claimed is:

1. A sensor for determining concentration of an analyte in a body fluid, wherein the sensor is at least partially implantable into a body tissue, the sensor comprising:
   a substrate;
   a first working electrode and a second working electrode, each comprising:
      a working electrode conductive pad applied to the substrate, and an electrically conductive sensor material applied to the working electrode conductive pad and having a detector substance adapted to perform an electrically detectable electrochemical detection reaction with the analyte;

a counter electrode comprising a counter electrode conductive pad applied to the substrate;

an electrically insulating material surrounding the counter electrode conductive pad on all edges and having a height that at least equals the height of the counter electrode conductive pad;

wherein a portion of the sensor having the working electrode and counter electrode conductive pads is configured for insertion into body tissue;

wherein the first and second working electrodes are arranged on a first surface of the substrate and the counter electrode is arranged on a second surface of the substrate, wherein the first and the second surfaces are arranged on opposite sides of the substrate;

wherein at least one of the working electrodes at least partially overlaps the counter electrode when viewed from a top view of the first surface; and wherein the working electrodes and counter electrode are arranged symmetrically with respect to the longitudinal axis of the sensor.

2. The sensor of claim 1, wherein the electrically insulating material forms at least one layer having at least one opening, and wherein the counter electrode conductive pad is located at least partially inside the opening.

3. The sensor of claim 1, wherein the electrically insulating material surrounds the working electrode conductive pad on all edges.

4. The sensor of claim 1, wherein the counter electrode further comprises an electrically conductive counter electrode material that at least partially covers the counter electrode conductive pad.

5. The sensor of claim 4, wherein the height of the electrically insulating material at least equals the height of the electrically conductive counter electrode material.

6. The sensor of claim 1, wherein the counter electrode further comprises an electron transfer interface, wherein the electron transfer interface, in an implanted state of the sensor, contacts the body fluid, and wherein the height of the electrically insulating material at least equals a height of the electron transfer interface.

7. The sensor of claim 1, wherein the electrically insulating material surrounds the electrically conductive working electrode sensor material on all edges, and wherein the height of the electrically insulating material at least equals a height of the electrically conductive working electrode sensor material.

8. The sensor of claim 1, wherein the counter electrode conductive pad further comprises an electrically conductive redox material adapted to perform a redox reaction, wherein the electrically insulating material surrounds the redox material on all edges, and wherein the height of the electrically insulating material at least equals a height of the redox material.

9. The sensor of claim 1, further comprising a reference electrode comprising a reference electrode conductive pad and an electrically conductive reference electrode material having a reference redox material with a known redox potential.

10. The sensor of claim 9, wherein the electrically insulating material surrounds the electrically conductive reference electrode material on all edges, and wherein the height of the electrically insulating material at least equals a height of the electrically conductive reference electrode material.

11. The sensor of claim 1, wherein the substrate has an elongated shape having an axis of longitudinal extension, and wherein, in a direction perpendicular to the axis of longitudinal extension, at least one of the working electrode and the counter electrode are equally spaced apart from at least two lateral edges of the substrate.

12. The sensor of claim 1, wherein the substrate and the electrically insulating material form a single structure.

13. The sensor of claim 1, wherein the substrate and the electrically insulating material form two distinct structures.

14. The sensor of claim 1, wherein the electrically insulating material defines a window in which a top surface of the working electrode conductive pad remains free of the insulating material.

15. The sensor of claim 14, wherein a portion of the working electrode conductive pad extends beyond the window, whereby the insulating material overlaps the working electrode conductive pad.

16. The sensor of claim 15, wherein the portion of the working electrode conductive pad that extends beyond the window extends under the insulating material.

17. The sensor of claim 1, wherein the electrically insulating material forms at least one window for the counter electrode conductive pad and/or the working electrode conductive pad.

18. The sensor of claim 1, wherein the electrically insulating material forms multiple windows for the counter electrode and/or at least one of the first and second working electrodes.

19. The sensor of claim 1, wherein a portion of the electrically insulating material is located between the counter electrode conductive pad and the working electrode conductive pad, thereby preventing an electric field from forming in places other than a top surface of the counter electrode conductive pad and the working electrode conductive pad.

20. The sensor of claim 1, wherein the working electrodes completely overlap the counter electrode.

21. The sensor of claim 1, wherein the working electrodes comprise a series of spaced working electrodes arranged along the longitudinal axis of the sensor.

22. The sensor of claim 21, wherein the counter electrode comprises an elongated electrode extending along the longitudinal axis of the sensor.

23. The sensor of claim 22, wherein all working electrodes overlap the elongated counter electrode.

* * * * *